INVENTORS
JOHN D. CANTONI
ALFRED W. GERRANS
ROBERT W. SELLECK
BY Mellin, Moore + Weissenberger
ATTORNEYS

INVENTORS
JOHN D. CANTONI
ALFRED W. GERRANS
ROBERT W. SELLECK
BY Mellin, Moore + Weissenberger
ATTORNEYS United States Patent Office 3,282,314
Patented Nov. 1, 1966

3,282,314
DRUPE PITTING METHOD AND APPARATUS INCLUDING SEGREGATING MEANS FOR PITTED AND UNPITTED FRUIT
John D. Cantoni, Alfred W. Gerrans, and Robert W. Selleck, Santa Clara, Calif., assignors to Sunsweet Growers, Inc., San Jose, Calif., a corporation of California
Filed June 17, 1965, Ser. No. 464,653
9 Claims. (Cl. 146—238)

This invention relates to a method and apparatus for pitting drupaceous fruit. More particularly, it relates to an improvement over the method and apparatus disclosed in co-pending application Serial No. 352,814 filed March 18, 1964, and entitled, Method and Apparatus for Depitting Drupaceous Fruit and Depitted Product, and is a continuation-in-part thereof.

The invention disclosed in the parent application provides a highly satisfactory method and apparatus for pitting drupaceous fruit and particularly dried prunes. It is not, however, one hundred percent efficient. Although highly satisfactory, the pitting machine disclosed therein fails to remove the pit from a small percentage of prunes cycled through it. This failure is due to the natural variations in size, firmness, shape, and pit orientation of the dried prunes. Although the apparatus disclosed in the parent application minimizes the natural variations, they cannot be eliminated and a small number of prunes complete the pitting cycle with their pits not completely removed.

This invention discriminates between the pitted (having the pit removed) and unpitted (having the pit intact or substantially intact) prunes after they have been cycled through the pitting apparatus and segregates one from another. Thus the invention produces two segregated cycled batches, one consisting of only unpitted prunes, the other consisting of pitted prunes.

Accordingly, it is an object of this invention to provide a method and apparatus for discriminating between pitted and unpitted drupaceous fruit.

It is another object to provide a method and apparatus for segregating unpitted drupaceous fruit from pitted drupaceous fruit.

It is another object to provide apparatus for forcefully and positively removing the drupaceous fruit from the stripping die for the purpose of directing it toward a deflecting plate for eventual deposit among either pitted or unpitted fruit.

It is a further object to provide an improved stripping die which makes possible quick release of the pitted fruit therefrom.

It is a further object to provide an improved pitting die which aids in the discrimination referred to above.

It is a further object to provide apparatus for positively and forcefully removing pits from the pitting die.

It is a further object to provide a method and apparatus for discriminating between pitted and unpitted drupaceous fruit which utilizes a probe mounted for reciprocal movement toward the pit of said fruit and has a stroke limited by the position of said pit.

It is a further object to provide a pivotally operated deflector plate which is positioned as a function of the position of the probe described above for the purpose of deflecting either pitted or unpitted prunes to thereby segregate them.

It is a further object to provide means for co-ordinating the action of the pitting, discriminating and segregating steps to thereby produce two segregated batches of dried fruit, one consisting of unpitted fruit, the other consisting of pitted fruit.

Each of the above objects is fulfilled by the specific embodiment which is shown in the drawings wherein:

FIG. 3 is a sectional view taken on the line 3—3 in FIG. 2. It is a sectional view of the complete pitting turret although the complete turret does not appear in FIG. 2. FIG. 3 also shows the deflector plate and its linkage, the flipping fingers and their linkage (for flipping fruit from the srtipping die toward the deflector plate), and the paddle which slaps the pit from the pitting die thereby positively and forcefully removing it therefrom. In addition, FIG. 3 shows the delivery roller turret and its relationship with the pitting turret fingers.

FIG. 4 is an enlarged sectional view taken on the lines 4—4 of FIG. 2 and shows the deflector plate, its cam operated linkage, the flipping fingers and their linkage, and the deflector plate trip lever. In addition, FIG. 4 shows a portion of the pitting turret which does not appear in FIG. 2. The relative positions of the pitting turret fingers, the stripping die, the probe, the flipping fingers, the deflector plate trip lever, and the deflector plate are shown.

FIGS. 8–14 show the stripping die, the pitting die (in the case of FIGS. 10–14), the probe, and the deflector plate trip lever in various positions which occur at various stages in the pitting operation. The figures are sequential views with FIGS. 12 and 13 being alternative, i.e., either FIG. 12 or FIG. 13 shows a step in the sequence but not both. FIG. 12 shows a (successfully) pitted fruit. FIG. 13 shows an unpitted fuit. The view shown in FIG. 14 occurs only in the case of a successful pitting operation.

The improved apparatus for pitting drupaceous fruit which comprises the present invention includes four phases of improvement:

(1) Linkage for discriminating between pitted and unpitted fruit, (2) Linkage for segregating the fruit in response to the above discrimination, (3) Linkage for forcefully and positively removing pitted and unpitted fruit from the stripping die, and (4) Linkage for forcefully and positively removing pits from the pitting die.

Figure 1:
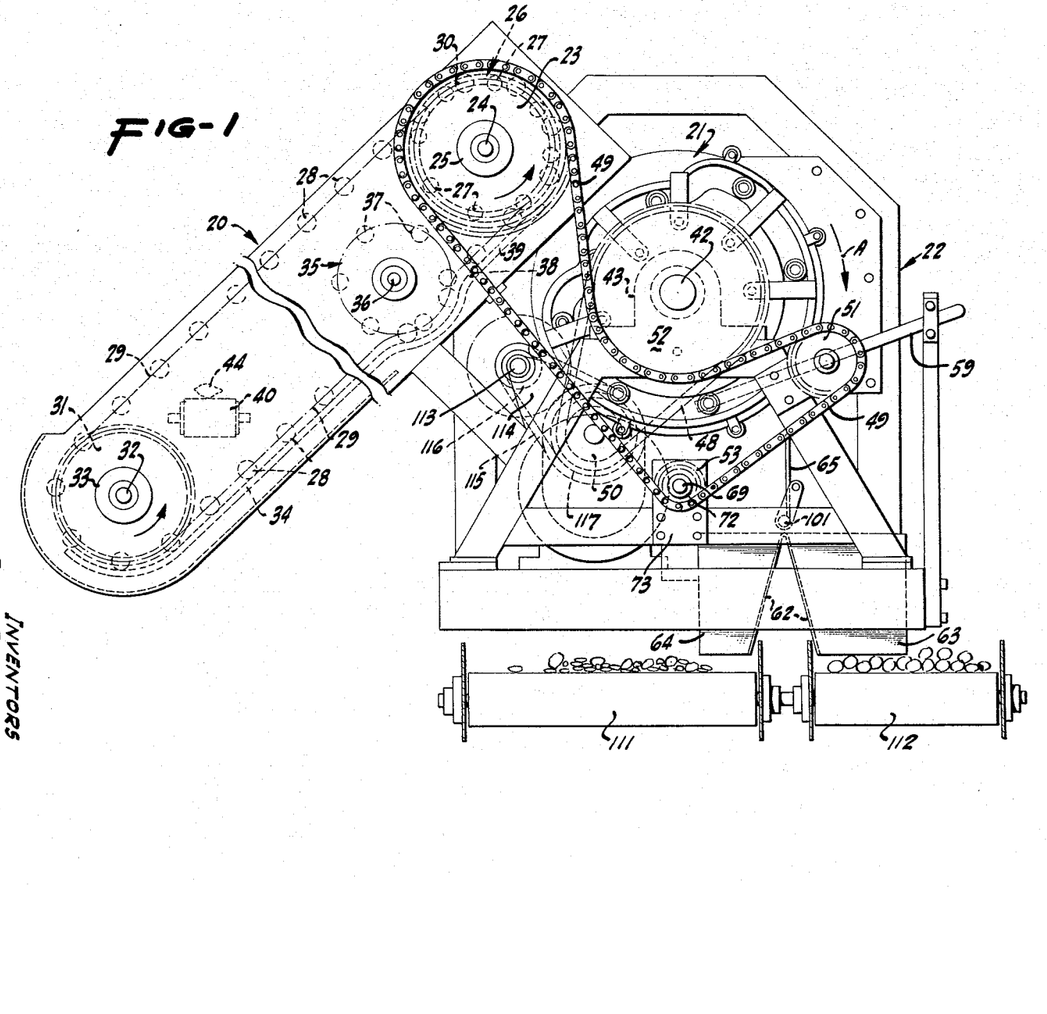
FIG. 1 is a side view of the improved pitting apparatus and shows a frame, an inclined orienting and shaping conveyor, a pitting turret, a deflector plate for deflecting and segregating unpitted and pitted fruit, and two output conveyors, one for pitted fruit (on the right) and the other for unpitted fruit.

The improvements are operatively associated with apparatus of the type which appears generally in FIG. 1. The apparatus shown there is described in great detail in co-pending parent application Serial No. 352,814 filed March 18, 1964, and in co-pending application Serial No. 271,793 filed April 9, 1963, now Patent No. 3,234,984, and entitled, Fruit Handling Machinery. It will, nevertheless, be briefly described herein.

The description will be given with reference to pitting a prune. It will be readily understood, however, that the invention is not limited to pitting prunes. Other drupaceous fruits may also be pitted with the apparatus described herein without departing from the scope of the present invention.

The basic pitting apparatus includes a prune orienting and shaping conveyor referred to generally as 20, a pitting turret 21, and a frame 22. The orienting and shaping conveyor 20 includes a sprocket 23 keyed to shaft 24 which is journaled in side plate bearing 25 for rotation therein. Delivery roller turret 26 is keyed to shaft 24 and includes delivery rollers 27 which are mounted to delivery roller turret 26. Rollers 28 are mounted on chain 29 which extends around sprocket 30 keyed to shaft 24 and around sprocket 31 which is rotatable on shaft 32. Shaft 32 is mounted in side plate bearings 33. Orienting and shaping conveyor 20 also includes an inclined ramp 34 along which prunes are swept by rollers 28 and shaping turret 35. Shaping turret 35 is mounted to shaft 36 and contains shaping rollers 37. Ramp 34 terminates at 38 at which point two fingers 39 extend from ramp 34 to delivery rollers 27. The fingers 39 are spaced to allow pitting turret fingers 41 to pass therethrough and extend in the direction of travel of chains 29.

The elements described operate to roll prunes up ramp 34 as they are delivered to conveyor 20 by conveyor 40. Rollers 28 sweep prunes one at a time up ramp 34 and finally deliver them to fingers 39 from which they are removed by pitting turret fingers 41.

Pitting turret fingers 41 are pivotally mounted in pitting turret assembly 21. The latter is mounted for rotation on pitting turret shaft 42 which is journaled in bearing 43 mounted to frame 22. Pitting turret assembly 21 contains eight sets of pitting turret fingers 41 and they each grip a prune 44 as they sweep between fingers 39 as pitting turret assembly 21 rotates in the direction of arrow A in FIG. 1 and FIG. 3. Thus, each set of pitting turret fingers 41 grips one prune 44 and, as pitting turret assembly 21 rotates, the prune is eventually positioned in alignment with stripping die 45, pitting rod 46, and pitting die 47 for pitting which may be seen in FIGS. 2 and 10.

With reference to FIG. 1, pitting turret assembly 21 and orienting and shaping conveyor 20 are operated by chain drive 48 and 49 respectively. Chain drive 48 extends from motor drive sprocket 50 and around a pitting turret sprocket (not shown) keyed to pitting turret shaft 42. Chain drive 49 extends around idler pinion and sprocket 51, pitting turret sprocket 52 (keyed to shaft 42), sprocket 23, and segregator sprocket 53. Thus, drive sprocket 50 drives pitting turret sprocket 52 and sprocket 23 to operate both pitting turret assembly 21 and orienting and shaping conveyor 20.

Figure 2:
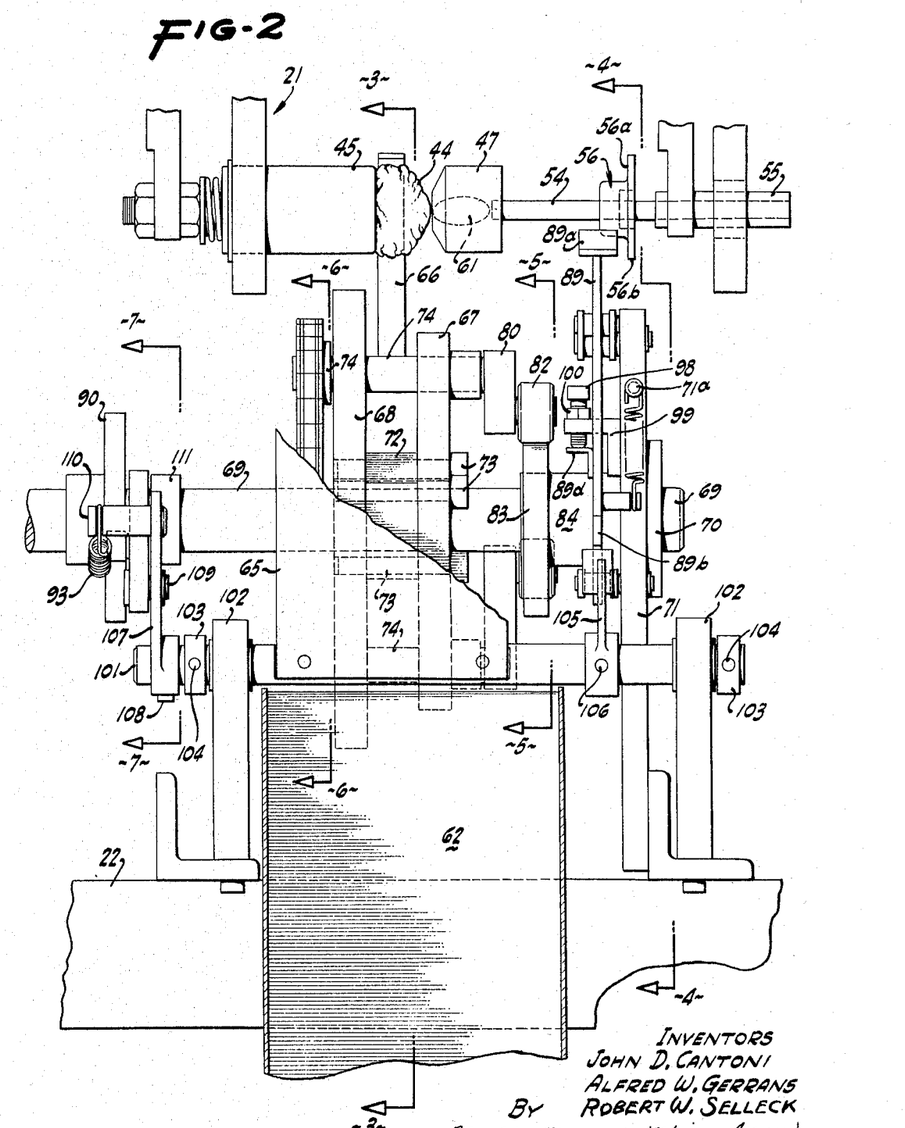
FIG. 2 is a partial end view of the apparatus shown in FIG. 1. It includes a partial side view of the pitting turret and shows the stripping die, the pitting die, the probe, the deflector plate (with a section removed) and its position and linkage with respect to the probe.
Figure 10:
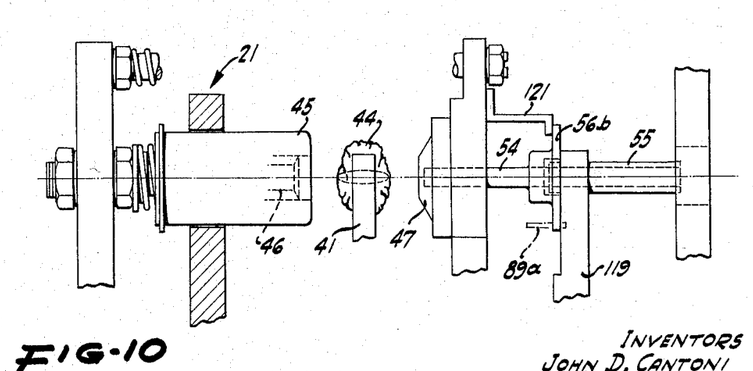
FIG. 10 shows the fruit aligned with the stripping and pitting die for the pitting operation.

A detailed description of the construction and operation of pitting turret assembly 21 may be found in the parent application referred to above. For the purpose of the invention described herein it is sufficient to understand that pitting turret fingers 41 deliver a prune 44 from prune orienting and shaping conveyor 20 to alignment with stripping die 45, pitting rod 46, and pitting die 47, as shown in FIG. 10, at which point the prune is pitted as shown in FIGS. 2, 11 and 12.

The apparatus of the prior art and particularly the apparatus disclosed in each of the co-pending applications referred to above, is capable of pitting a prune but nothing in addition. The apparatus of the prior art delivers a prune to a position as shown in FIG. 2 and at that time removes the prune from the stripping die 45 indiscriminately, i.e., the apparatus is not capable of discriminating between a pitted prune and one which has not been successfully pitted nor is it capable of forcefully and positively removing the prunes, pitted or unpitted, from the stripping die and propelling them to a designated area at a designated time to segregate the pitted from the unpitted prunes. The invention disclosed herein finds application at this point in the pitting process. It discriminates between unpitted and pitted prunes and segregates them accordingly. The invention may be conveniently described with reference to the phases of improvement referred to above.

*Linkage for discriminating between pitted and unpitted prunes*

Figure 11:
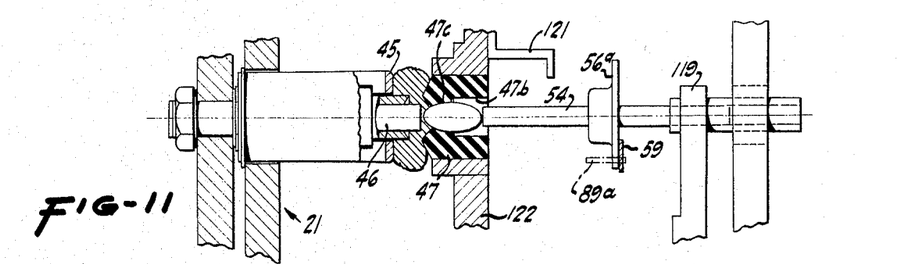
FIG. 11 shows the elements during the pitting operation at the completion of the forward stroke of the pitting rod into the fruit (in this case, a prune) for the purpose of pushing the pit therefrom and into the pitting die.
Figure 12:
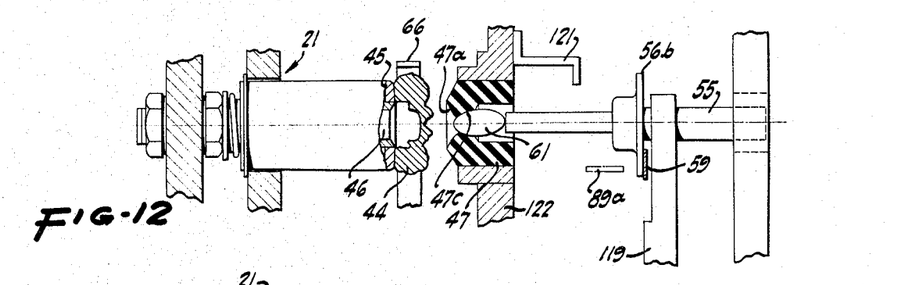
FIG. 12 shows a pitted prune with the stripping die and pitting die in a retracted position. It shows the probe and its relationship with the pit and the deflector plate trip lever. Since the prune has been successfully pitted, the trip lever is not actuated by the probe collar. The deflector plate, therefore, does not deflect the prune into the compartment for unpitted prunes as it is propelled by the flipping fingers. The flipping finger is shown in a position immediately prior to engaging the prune.
Figure 13:
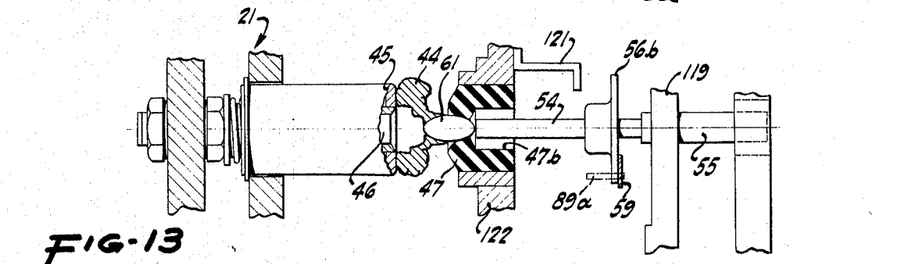
FIG. 13 shows an unpitted prune or, stated another way, a prune that has not been successfully pitted. It shows the same elements as seen in FIG. 12 and illustrates the difference in the position of the probe and its relationship with the lockout lever in the case of a prune which has not been successfully pitted. The lockout lever is actuated by the probe collar and the deflector plate is retracted allowing the prune to be propelled by the flipping finger shown to the compartment for unpitted prunes.

The apparatus for discriminating between pitted and unpitted prunes is shown in FIGS 2 and 8–14. It includes a probe 54 which is mounted for reciprocal movement in sleeve 55. Collar 56 is secured to probe 54 and includes flange 56a and lockout surface 56b. A single leaf spring 59 is mounted at one end to frame 22. Probe 54 and collar 56 are arcuately swept on pitting turret assembly 21 past and into engagement with leaf spring 59. Spring 59 becomes engaged with flange 56a and urges collar 56 and probe 54 in a direction toward the left as viewed in FIGS. 11–13. Leaf spring 59 is positioned so that it engages flange 56a when stirpping die 45, pitting rod 46 and pitting die 47 are as shown in FIGS. 11–13. Thus, at a point soon after prune 44 is pitted probe 54 is urged into engagement with pit 61.

Leaf spring 59 is chosen so that it urges probe 54 into engagement with pit 61 but does not press pit 61 from pitting die 47. Thus, the traverse of probe 54 is limited by the position of pit 61 in pitting die 47. If pit 61 is successfully removed from prune 44, as hown in FIG. 12, then probe 54 and collar 56 extend to the left only for the distance shown. If, on the other hand, pit 61 is not successfully removed from prune 44, as shown in FIG. 13, probe 54 travels further to engage pit 61 and the position of collar 56 travels correspondingly further. It may be seen that lockout surface 56b has one position in the case of a pitted prune (see FIG. 12) and has another position in the case of an unpitted prune (see FIG. 13).

Probe 54 therefore provides a means of discriminating between pitted and unpitted prunes. Together with collar 56 and lockout surface 56b it provides a basis for segregating the pitted from the unpitted prunes.

*Linkage for segregating pitted from unpitted prunes*

The apparatus for segregating the pitted from the unpitted prunes is actuated and controlled by the position of lockout surface 56b and appears best in FIGS. 1–7.

Figure 4:
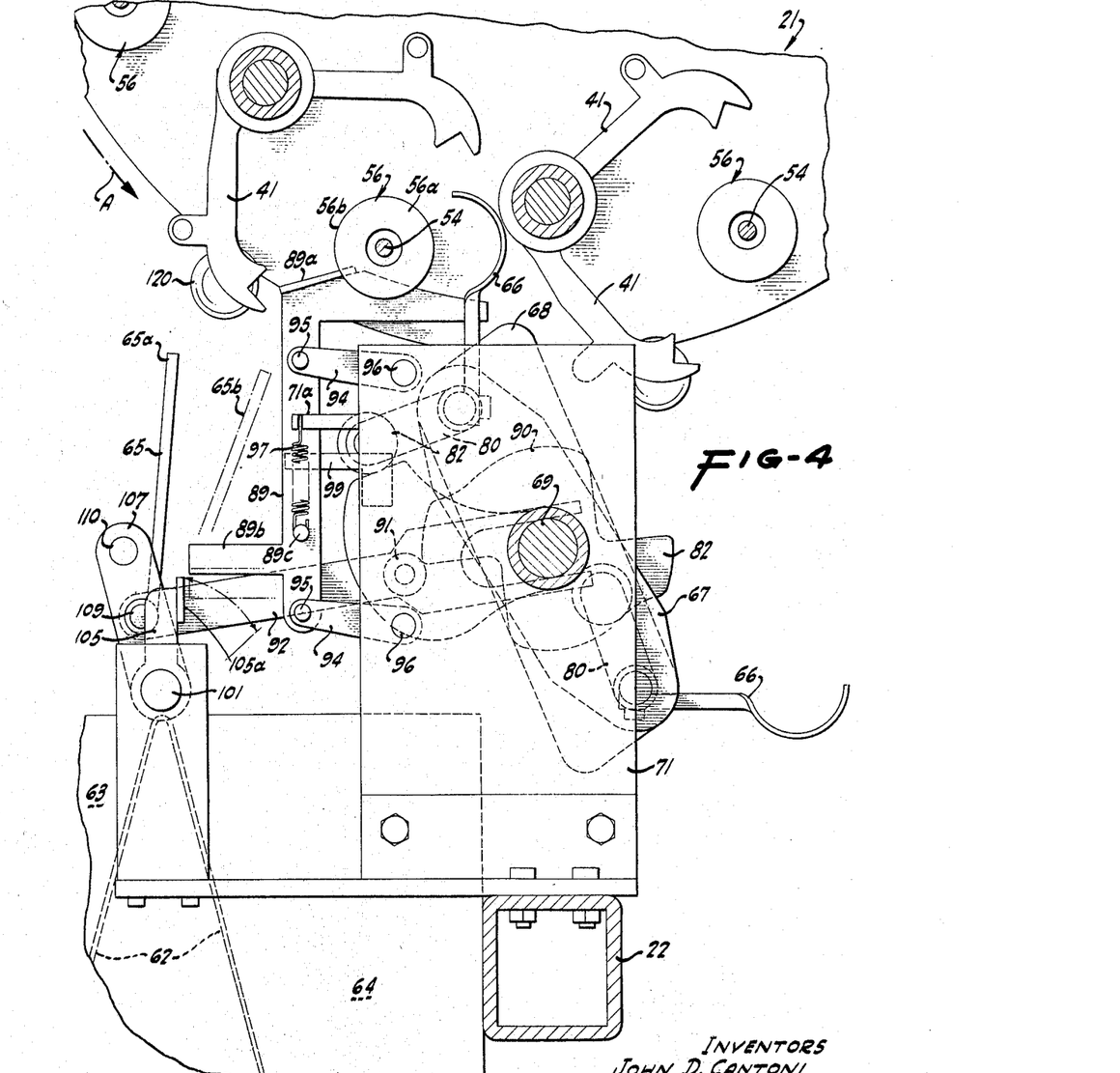

With particular reference to FIG. 4, the apparatus includes divider wall 62 which divides compartment 63 for pitted prunes from the compartment 64 for unpitted prunes.

Flipping fingers 66 propel prunes from a position in which the prune is engaged with stripping die 45 toward deflector plate 65. Deflector plate 65 may be positioned as shown at 65a, 65b or 65c. When positioned as shown at 65a, unpitted prunes 44 are deflected into compartment 64. Position 65b is a neutral position. When positioned as shown at 65c, pitted prunes 44 are not deflected by deflector plate 65 and come to rest in compartment 63.

Figures 5, 6, 7:
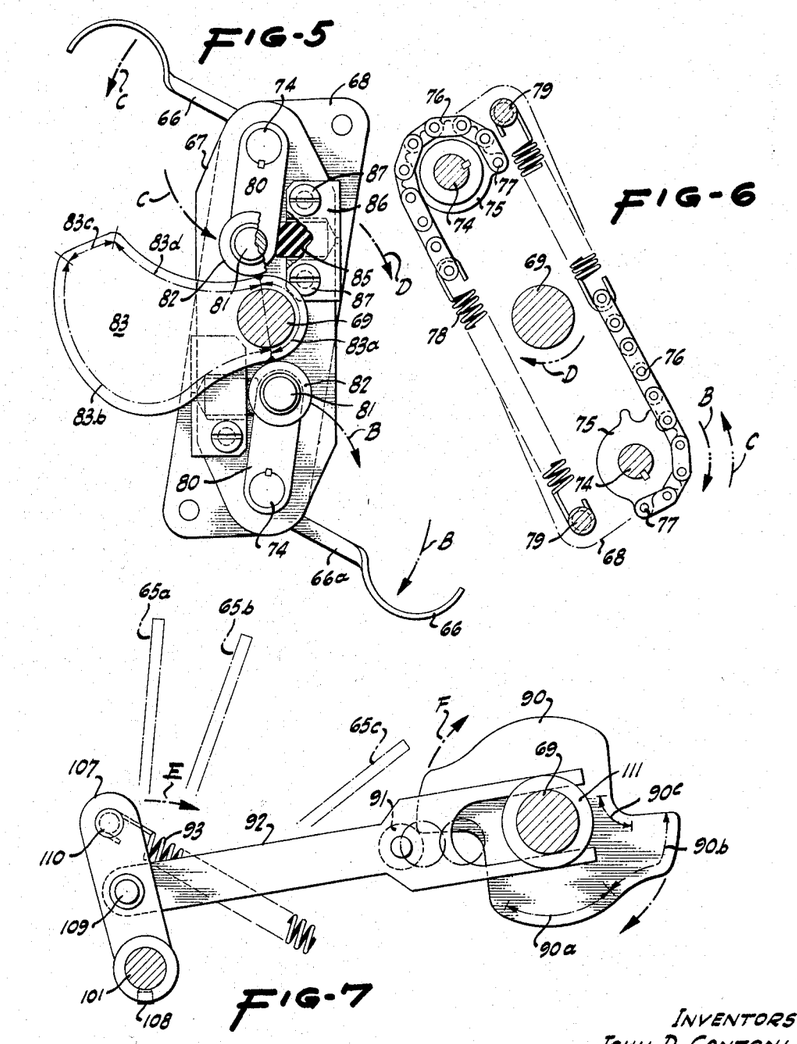
FIG. 5 is a sectional view taken on the line 5—5 of FIG. 2 and shows the mounting and linkage of the flipping fingers.
FIG. 6 is a sectional view taken on line 6—6 of FIG. 2 and shows the spring loading of the flipping finger shafts. The spring loading constantly urges the flipping fingers in the direction of the arrow in FIG. 5 and keeps the flipping finger cam follower in contact with the cam.
FIG. 7 is a sectional view taken on line 7—7 of FIG. 2 and shows the cam operation of the deflector plate linkage.

The flipping finger mounting and linkage appears in FIGS. 2–6. With particular reference to FIGS. 5 and 6, the linkage includes a mounting plate 67 and a bias mounting plate 68 at least one of which is keyed to segregator shaft 69. Shaft 69 is mounted for rotational movement at one end in bearing 70 attached to mounting bracket 71 which is fixed to frame 22 (see FIG. 2). The other end of shaft 69 is mounted for rotational movement in a similar bearing 72 fixed to mounting bracket 73 which is also fixed to frame 22 (see FIG. 1). Segregator sprocket 53 is keyed to segregator shaft 69 which is therefore rotated by chain drive 49. With reference to FIG. 2, mounting plate 67 and bias mounting plate 68 are spaced and mounted together by spacers 72 and bolts 73, respectively. Two identical flipping finger shafts 74 extend through both plates 67 and 68 and are rotatable therein. Flipping finger 66 is fixed to shaft 74 at the portion that lies between plates 67 and 68.

Semi-sprocket 75 is keyed to the end of shaft 74 nearest bias mounting plate 68 as shown in FIGS. 2 and 6. Biasing chain 76 is pinned through a terminal sprocket finger by means of pin 77 and extends around semi-sprocket 75 to coil spring 78 which is in tension. Coil spring 78 is hooked in the recess of pin 79 which is fixed to plate 68. Thus, shafts 74 are rotatable in the direction of arrow B in FIG. 5 against the bias of spring 78. Spring 78 and chain 76 constantly urge semi-sprocket 75, shaft 74, and flipping finger 66 to rotate in the direction of arrow C in FIG. 5. Rotation in the direction of arrow C is stopped by stops 85, which will be described below, when semi-sprocket 75 is in the position shown in FIG. 6.

Cam follower arm 80 is keyed to shaft 74 as best seen in FIG. 5. The other end of arm 80 is provided with cam follower pin 81. Cam follower 82 is rotatably mounted on cam follower pin 81. Thus, as cam follower 82 is arcuately swept about shaft 74, flipping fingers 66 are also arcuately swept as shown, for example, by arrow C in FIG. 5.

Cam 83, shaped as shown in FIG. 5, is mounted concentrically about the centerline of segregator shaft 69 and fixed to mounting bracket 71 by means of sleeve 84. Thus, cam 83 does not rotate as segregator shaft 69 rotates.

Cam follower arm stop 85 is adjustably mounted to plate 67 by means of recessed mounting plates 86 and bolts 87. Stops 85 are positioned to engage follower arms 80 in FIG. 5. Thus the arcuate travel of follower arm 80 may be controlled and adjusted by loosening bolts 87 and sliding stop 85 in the recess of mounting plate 86 after which bolts 87 are tightened. Stops 85 prevent rotation of semi-sprocket 75 by spring 78 and chain 76 beyond the point shown in FIG. 6 since follower arm 80 and semi-sprocket 75 are both keyed to shaft 74.

As mounting plate 67 and 68 are rotated with shaft 69 in the direction of arrow D in FIG. 5, cam follower 82 constantly engages cam 83 which remains stationary. The position of flipping fingers 66, with respect to an imaginary reference line drawn through the axis of each shaft 74, is consequently controlled.

Figure 3:
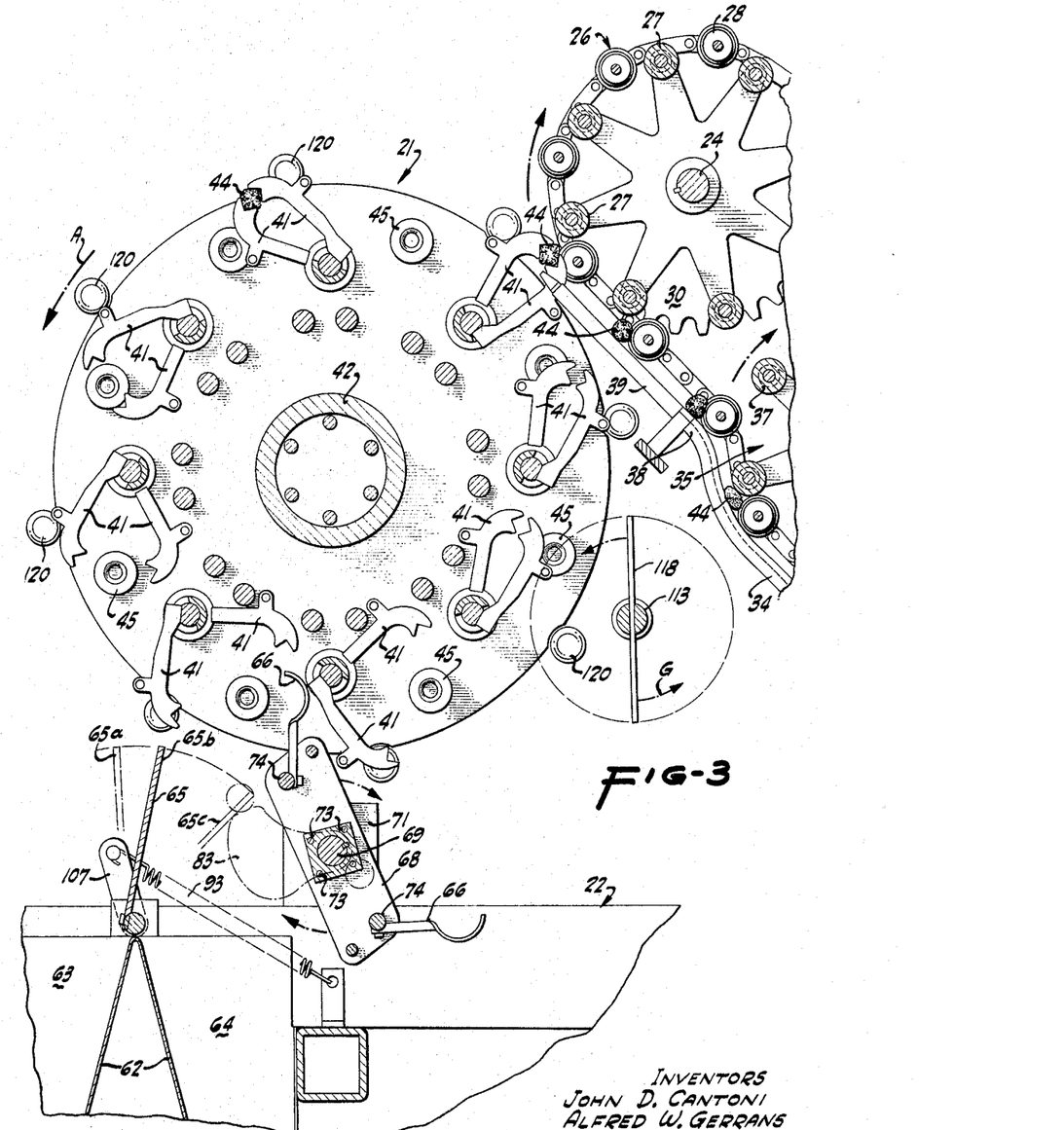

With reference to FIG. 5, the cam surface of cam 83 may be conveniently divided into constituent surfaces 83a, 83b, 83c and 83d. Surface 83a is a dwell surface in which flipping fingers 66 remain fixed with respect to the reference line during the travel of cam follower 82 thereover. The position of flipping fingers 66 for that portion of the cycle is shown in FIG. 5. Surface 83b is a transitional surface during which time shaft 74 is rotated in the direction of arrow B in FIG. 6 against the tension in spring 78 to an extreme position in which the angle from the reference line to the arm 66a of flipping finger 66 is approximately 225°. That position of arm 66a with respect to the imaginary reference line is not shown. Surface 83b controls the position of flipping fingers 66 to allow them to pass beneath prune 44 and take a cocked position preliminary to striking prune 44. Surface 83c is also a dwell surface but not in the same sense as surface 83a. During the travel of cam follower 82 along surface 83c, shaft 74 rotates in the direction of arrow C in FIG. 5 to keep flipping finger 66 in a substantially fixed angular position relative to frame 22. That position is shown in FIGS. 3 and 4. Surface 83d is an action surface. As cam follower 82 traverses surface 83d it is unrestrained and the energy in spring 78 is suddenly released. Flipping fingers 66 move sharply and quickly from the position shown in FIGS. 3 and 4 to the position shown in FIG. 5 to slap prune 44 and propel it in the direction of deflector plate 65. The end of the slapping stroke is fixed by stops 85 which have been previously described.

Thus as segregator shaft 69 rotates, mounting plates 67 and 68, flipping finger shafts 74, and flipping fingers 66 also rotate about the axis of a shaft 69. Cam followers 82 ride against cam 83 and, with the aid of springs 78 and chain 76, flipping fingers 66 intermittently rotate on shaft 74 to move in behind prune 44 and slap it from stripping die 45 toward deflector plate 65 as described above.

The deflector plate linkage appears best in FIGS. 4 and 7. The position of deflector plate 65 is controlled and co-ordinated with the action of flipping finger 66 by means of lockout lever 89, cam 90, cam follower 91, cam follower arm 92 and spring 93. Lockout lever 89 includes tripping face 89a and arm 89b. It is mounted to bracket 71 by means of arms 94; pins 95 pivotally connect arms 94 with lockout lever 89 and pins 96 provide a similar connection with bracket 71. Lockout lever 89 is therefore mounted for movement vertically and arcuately about pins 96. With reference to FIGS. 2 and 4, lockout lever 89 is constantly urged upwardly by spring 97 which is in tension and hooked at one end to arm 71a of bracket 71 and at the other end, in the recess of pin 89c which is fixed to lockout lever 89. The upward movement of lockout lever 89 is limited by means of stop 89d which is fixed to lockout lever 89. Bolt 98 is threadably engaged with bracket 99 which is mounted to bracket 71. Nut 100 is threadably engaged with bolt 98 and positioned between the head of bolt 98 and bracket 99. Bracket 99 is positioned on bracket 71 so that bolt 98 is aligned with stop 89d as shown in FIG. 2. Thus, bolt 98 abuts stop 89d and limits upward movement of lockout lever 89. It will be readily seen that the upper limit of lockout lever 89 may be adjusted by loosening nut 100, rotating bolt 98 in which ever direction desired followed by tightening nut 100 against bracket 99.

Lockout lever 89 is positioned with respect to lockout surface 56b of collar 56 so that tripping face 89a, when lockout lever 89 is at its upper limit, lies within the arcuate path of lockout surface 56b. This critical orientation may be seen in FIGS. 2 and 4. Thus, when probe collar 56 is aligned as shown in FIG. 13, lockout surface 56b will engage tripping face 89a of lockout lever 89 as collar 56 moves arcuately, and lockout lever 89 is forced downwardly against spring 97 until lockout surface 56b moves beyond tripping face 89a and releases lockout lever 89.

The reflector plate mounting appears best in FIGS. 2 and 4. Deflector plate 65 is mounted to deflector plate shaft 101. Shaft 101 is rotatably mounted in brackets 102 which are fixed to frame 22. Collar 103 is secured to each end of shaft 101 by means of set screws 104. Lockout lever engagement arm 105 is mounted to saft 101 by means of set screw 106 and it is horizontally aligned with lockout lever arm 89b as shown in FIG. 2. Cam actuated arm 107 is mounted to the end of shaft 101 by means of set screw 108. Cam follower arm pin 109 and spring pin 110 are fixed to arm 107. One end of deflector plate spring 93 is hooked in the recess of spring pin 110 and the other end is hooked to frame 22. Spring 93 is in tension and therefore constantly urges cam actuated arm 107, cam follower arm pin 109, shaft 101 and lockout lever engagement arm 105 in the direction of arrow E, FIG. 7.

Cam follower arm 92 is forked at one end and slidably and rotatably receives segregator shaft 69 between cam 90 and collar 111 which are both fixed to shaft 69. The other end of arm 92 is pivotally pinned to arm 107 at pin 109. Spring 93 insures that cam follower 91 is constantly in contact with cam 90 as the latter rotates with shaft 69 in the direction of arrow F in FIG. 7. Cam 90 has duplicate camming surfaces so that one revolution of shaft 69 produces two camming cycles, one for each flipping finger 66. The three cam surfaces 90a, 90b, and 90c correspond to the positions 65a, 65b and 65c, respectively, of deflector plate 65.

Having thus described the structure of the linkage for segregating pitted from unpitted prunes, the operation, internal co-ordination, co-ordination with the pitting turret, and co-ordination with the discriminating linkage is best understood with reference to FIGS. 2–4, 12 and 13. With reference to FIG. 4 mounting plate 67, cam 83 and cam 90 are angularly oriented on shaft 69 as shown. Thus, the co-ordination of the action of flipping fingers 66 with the action of cam follower arm 92 and deflector plate 65 is fixed. The rotation of shaft 69 is co-ordinated with the rotation of pitting turret 21 (which has eight stripping dies) so that it rotates four times for each rotation of pitting turret 21. Co-ordination may be accomplished by designing sprocket 53 with an effective circumference of one-fourth the effective circumference of sprocket 52. Thus, one flipping finger 66 is positioned as shown in FIG. 4 as each stripping die 45 passes.

Lockout lever 89 is positioned with tripping face 89a slightly within the arcuate path of lockout surface 56b of collar 56 (see FIG. 4). It is further critically positioned, as best seen in FIGS. 2, 12 and 13 so that tripping face 89a is engaged by lockout surface 56b when probe 54 is in the position shown in FIG. 13 (unpitted prune) but not engaged when probe 54 is in the position shown in FIGS. 2 and 12 (pitted prune). Thus, when an unpitted prune is detected by probe 54, lockout lever 89 is pushed downwardly against spring 97 by lockout surface 56b in engagement with tripping face 89a. Arm 89b of lockout lever 89 is then placed into abutting alignment with the face 105a of arm 105. The abutting alignment is shown in FIG. 4 where the alternate position of lockout lever 89 is apparent.

Tripping face 89a is therefore either bypassed (in the case of a pitted prune) or engaged by lockout surface 56b (in the case of an unpitted prune) and arm 89b is either not aligned or aligned respectively with face 105a of arm 105. During the bypassing or engagement flipping finger 66 slaps prune 44 due to the unrestrained traverse of cam follower 82 over cam surface 83d. Prune 44 is therefore propelled toward deflector plate 65.

Immediately prior to the slapping action of flipping finger 66, cam follower 91 is positioned with respect to cam 90 as shown in FIGS. 4 and 7. Further rotation of cam 90 in the direction of arrow F allows cam follower 91 and follower arm 92 actuated by spring 93 to drop to cam surface 90c. (As that happens flipping finger 66 completes its sweep as cam follower 82 traverses surface 83d.) If arm 89b is not aligned with face 105c, deflector plate 65 swings to the position 65c as cam follower 91 drops to surface 90c and prune 44 (successfully pitted) comes to rest in compartment 63. If, on the other hand, arm 89b is aligned with face 105a, deflector plate 65 is prevented from swinging (and cam follower 91 is prevented from dropping) and assumes the position 65b which deflects prune 44 (unpitted) into compartment 64.

Thus, the segregator linkage operates to segregate pitted from unpitted prunes which are removed on conveyors 111 and 112 respectively (see FIG. 1).

*Pit deflector*

The mechanism for deflecting pits 61 from the pitting die 47 is a two-bladed paddle wheel with 180° between blades. Shaft 113 is journaled for rotation in brackets 114, one of which appears in FIG. 1. Shaft 113 is rotated in brackets 114 which are fixed to frame 22 in the direction of arrow G of FIG. 3 by means of chain drive 115, sprocket 116, keyed to shaft 113, and drive sprocket 117. Blades 118 rotate at a rate which insures that as pitting die 47 passes the area of shaft 113, pit 61 will be struck and propelled downwardly to conveyor 111. The rate of rotation is co-ordinated with the rate of rotation of pitting turret 21 since both chain drives 48 (pitting turret) and 115 (pit deflector) have a common drive sprocket 117.

Figure 14:
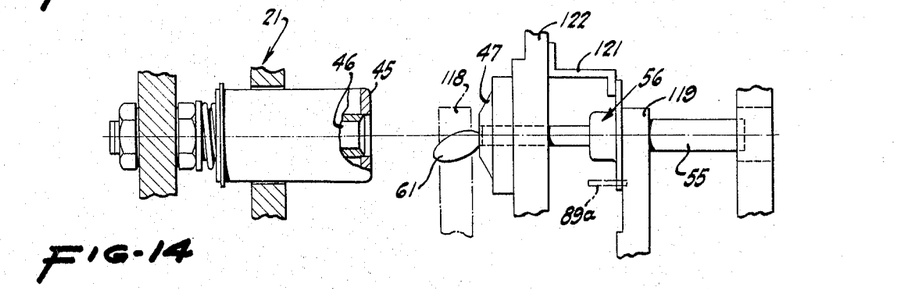
FIG. 14 shows the stripping die, the pitting die, and the probe after a successful pitting operation and includes a view of the paddle in a position immediately prior to striking the pit for forceful and positive removal from the pitting die.

Before pitting die 47 reaches the path of blade 118 but after it passes flipping finger 66, probe 54 is actuated to the left as viewed in FIG. 14 and enters pitting die 47 to push pit 61 out of pitting die 47. For the purpose of removing pit 61 from pitting die 47 arm 119 is actuated to the left and engages flange 56a of collar 56 to thereby forcefully move probe 54 into pitting die 47 (see FIG. 14). Arm 121 is fixed to pitting die mount 122 and engages flange 56a during its travel to the right to probe 54 beyond cavity 47b of pitting die 47 in preparation for the next pitting cycle.

Pitting die 47 is designed from resilient material with a conical entry 47a and a cavity 47b. Thus a circular gripping surface 47c is provided to resiliently grip pit 61 yet allow it to be pushed into cavity 47b by pitting rod 46 and out of cavity 47b by probe 54. After pit 61 is pushed out of cavity 47b it assumes a position as shown in FIG. 14 and is subsequently struck by blade 118.

Stripping die 45 is preferably designed with a diameter substantially equal to the diameter of prune 44 when it assumes the shape shown in FIGS. 11–14. It preferably has a plane surface which engages prune 44 and provides an area to which prune 44 may adhere with the aid of its natural stickiness. Thus stripping die 45 and prune 44 assume the position shown in FIG. 12 and flipping finger 66 may easily break the bond between prune 44 and stripping die 45 and propel prune 44 toward deflector plate 65.

Figure 8:
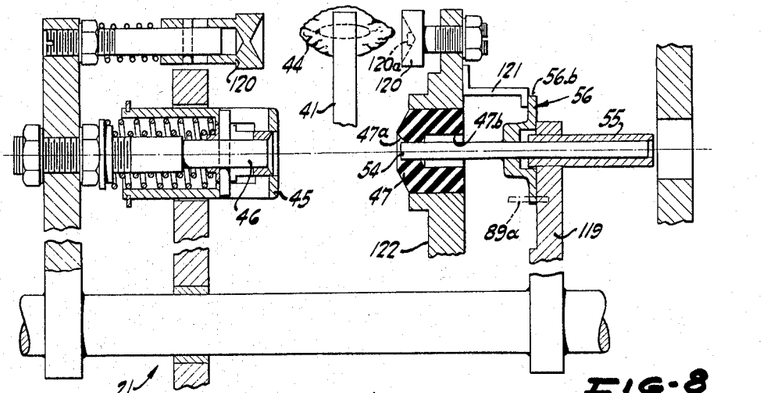
FIG. 8 is a sectional view showing the gripping fingers, compression heads, stripping die, pitting rod, pitting die, probe, collar, and mounting. The view is taken with the fruit aligned by the pitting turret fingers for compression by the compression heads.
Figure 9:
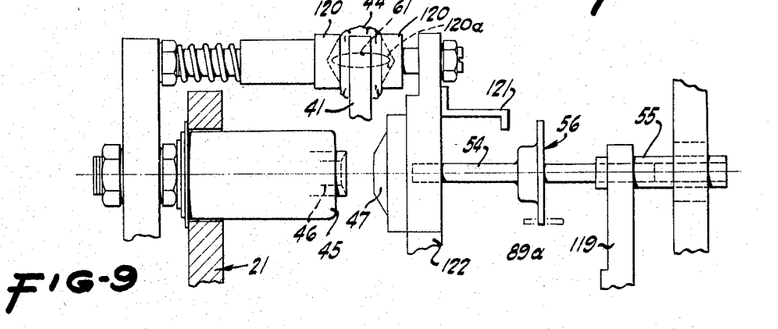
FIG. 9 shows the compression of the fruit by the compression heads.

FIGS. 8–10 show the step of compressing the prune 44 as it is held by pitting turret fingers 41. Compression heads 120 are provided to align pit 61 prior to the pitting operation and for that purpose are designed with a conical cavity which appears in FIG. 8. Rubber pre-stripping lugs 120a are provided to cause the pit to initially penetrate the skin of prune 44 during the compression step. The initial penetration insures that the pit emerges cleanly from prune 44 when forced by pitting rod 46 into pitting die 47. After pit 61 is aligned through the action of compression heads 120, pitting turret fingers 41 align prune 44 with stripping die 45, pitting rod 46 and pitting die 47 as shown in FIG. 10. The pitting operation then occurs as shown in FIG. 11 and from that point the discriminating, segregating, and pit deflecting linkages which comprise the present invention, become operative.

The method which comprises the present invention is readily understood with the aid of the foregoing description of the apparatus and consists of a method for discriminating between pitted and unpitted drupaceous fruit as well as a method for segregating the pitted from the unpitted fruit. The latter method is closely related to the former and together with the former, comprise a method for discriminating between and segregating pitted from unpitted drupaceous fruit.

The method for discriminating between pitted and unpitted fruit may be described with respect to a prune but, like the apparatus, is not limited in application to a prune. The method comprises pushing the pit from the prune into a pitting die, advancing a probe and index toward the pit in a direction that opposes the direction of entry of the pit into the die until the probe is in engagement with the pit. It is critical that the probe does not alter the position of the pit. During the engagement the position of the index may be noted since the index assumes one position in the case of a pitted prune and another position in the case of an unpitted prune.

With reference to FIGS. 11–13, apparatus is provided for pushing pit 61 from prune 44 in a direction from the left to the right into pitting die 47. The apparatus includes pitting rod 46, stripping die 45, and related linkages, the operation of which is disclosed in the co-pending patent application referred to above. After pit 61 is pushed by pitting rod 46 into pitting die 47, probe 54 is advanced toward pit 61. The probe is advanced by leaf spring 59 from the right to the left as viewed in FIGS. 11–13 or in a direction which opposes the direction of entry of pit 61 into pitting die 47. Probe 54 engages pit 61 but does not presently alter the position of pit 61 in pitting die 47, i.e., probe 54 does not presently push pit 61 out of pitting die 47.

Thus, the travel or advance of probe 54 is limited by the position of pit 61 in pitting die 47.

Probe 54 is provided with a collar 56 which serves as an index. The position of collar 56 is shown in FIG. 12 in the case of a pitted prune. In the case of an unpitted prune the position of probe 54 is altered with respect to the position shown in FIG. 12 and collar 56 also assumes a different position. Thus collar 56 serves as an index which, while probe 54 is in engagement with pit 61, assumes one position if the prune is pitted (FIG. 12) and another position if the prune is unpitted (FIG. 13). The position of the index may be noted and the discrimination accomplished.

The method for segregating pitted prunes from unpitted prunes is closely related to the method for discriminating between the two. It comprises propelling the prune from the stripping die during the engagement of the probe with the pit, and directing the flight of the prune by moving an obstruction into the path when the index assumes a given position during the engagement of the probe with the pit.

With reference particularly to FIG. 4, flipping finger 66 propels prune 44 in a direction toward deflector plate 65 when probe 54 is engaged with pit 61. Tripping face 89a is either actuated or not actuated by collar 56 which serves as an index. Depending upon whether or not collar 56 actuates trip lever 89, deflector plate 65 is either positioned to obstruct the path of prune 44 or is not so positioned. In the embodiment of the method disclosed herein deflector plate 65 obstructs the path of prune 44 when collar 56 is in the position shown in FIG. 13 or when the discriminating step indicates that the prune is unpitted. Tripping face 89a is critically positioned for this purpose. It will be readily recognized however that the position of tripping face 89a may be altered so that the opposite would be true. More particularly, collar 56 may actuate lockout lever 89 only in the case of a pitted prune. The flight of prune 44 would then be obstructed (by deflector plate 65) only if it was unpitted rather than only if pitted as presently shown. Thus, the method may be practiced by either obstruction the flight of an unpitted prune or a pitted prune.

The step of obstructing the flight deflects the path of the prune. Thus the prune is directed into compartment 64 if the flight is obstructed and into compartment 63 if not obstructed.

It will be recognized that the flight of prune 44 could be obstructed in both the case of a pitted prune and an unpitted prune. For example, a deflector plate having a V-shaped cross-section could be provided with the vertex of the V defining a line lying in a vertical plane defined by the flight of prune 44. Such a deflector plate, pointing toward prune 44, could be moved laterally thereby positioning the vertex of the V cross-section on either side of the vertical plane defined by the flight of prune 44. Thus, the prune 44 would be deflected to one side if unpitted and to the other side if pitted. Such a variation is within the scope of the method disclosed herein.

Having thus described the method and apparatus comprising the present invention, we claim:

1. In a machine for removing the pit from drupaceous fruit, apparatus for discriminating between pitted and unpitted fruit and segregating one from the other which comprises:
 (a) a probe mounted for movement into engagement with said pit, said probe having a collar;
 (b) resilient means mounted for application against said collar for urging said probe into said engagement;
 (c) means for propelling said fruit along a path during said engagement;
 (d) means for altering said path of said fruit depending upon the position of said probe during said engagement, said means including a lock-out lever mounted for actuation by said collar and a deflector plate operatively associated therewith; and
 (e) segregated receiving means for receiving said pitted and unpitted fruit respectively.

2. In a machine for removing the pit from drupaceous fruit, apparatus for discriminating between pitted and unpitted fruit and segregating one from the other which comprises:
 (a) a probe mounted for movement into engagement with said pit;
 (b) means for propelling said fruit along a path during said engagement, said means comprising:
  (1) a shaft rotatable on its axis to thereby define a direction of rotation,
  (2) a plate mounted to said shaft and rotatable therewith to thereby define a plane of rotation,
  (3) a finger pivotally mounted to said plate for pivotal movement in said plane,
  (4) resilient means for constantly urging said finger to pivot in a direction opposite said direction of rotation, and
  (5) camming means including a fixed cam, a cam follower, and a cam follower arm fixed to said finger, said cam having a convex surface for pivoting said follower arm and finger against said resilient means and a concave surface for releasing said follower arm, finger, and resilient means; and
 (c) means for altering said path of said fruit depending upon the position of said probe during said engagement.

3. In a machine for removing the pit from drupaceous fruit, apparatus for discriminating between pitted and unpitted fruit and segregating one from the other which comprises:
 (a) a probe mounted for movement into engagement with said pit, said probe having a collar;

(b) resilient means mounted for application against said collar for urging said probe into said engagement;

(c) means for propelling said fruit along a path during said engagement;

(d) means for altering said path of said fruit depending upon the position of said probe during said engagement, said means comprising:

(1) a shaft rotatable on its axis, (2) a cam mounted to said shaft for rotation therewith, said cam having an outer cam surface and an inner cam surface, (3) a deflector plate mounted for movement into and out of said path, (4) a cam follower arm pivotally connected to said plate, (5) a cam follower pivotally mounted to said cam follower arm and means for maintaining said follower in contact with said cam, and (6) a lockout lever mounted for reciprocal movement having a tripping face positioned for engagement with said collar, and an arm positioned for abutting said deflector plate during said engagement of said collar and tripping face, and resilient means for urging said lockout lever into engagement with said collar; and (e) segregated receiving means for receiving said pitted and unpitted fruit respectively.

4. In a machine having a stripping die, a pitting die and a pitting rod for removing the pit from drupaceous fruit, apparatus for discriminating between pitted and unpitted fruit and segregating one from the other which comprises:

(a) a probe mounted for movement toward said pitting rod into said pitting die and into engagement with said pit;

(b) a collar mounted to said probe and resilient means mounted for application against said collar for urging said probe into said engagement;

(c) means for propelling said fruit along a path during said engagement including:

(1) a shaft rotatable on its axis to thereby define a direction of rotation, (2) a plate mounted to said shaft and rotatable therewith to thereby define a plane of rotation, (3) a finger pivotally mounted to said plate for pivotal movement in said plane, (4) resilient means for constantly urging said finger to pivot in a direction opposite said direction of rotation, and (5) camming means including a fixed cam, a cam follower, and a cam follower arm fixed to said finger, said cam having a convex surface for pivoting said follower arm and finger against said resilient means and a concave surface for releasing said follower arm, finger, and resilient means;

(d) means for altering said path of said fruit including:

(1) a cam mounted to said shaft for rotation therewith, said cam having an outer cam surface and an inner cam surface, (2) a deflector plate mounted for movement into and out of said path, (3) a cam follower arm connected to said plate, (4) a cam follower pivotally mounted to said cam follower arm and means for maintaining said follower in contact with said cam, (5) a lockout lever mounted for reciprocal movement having a tripping face positioned for engagement with said collar, and an arm positioned for contact with said deflector plate during said engagement of said collar and tripping face, and resilient means for urging said lockout lever into engagement with said collar to thereby prevent movement of said deflector plate and operate against said means for maintaining said follower in contact with said cam; and (e) segregated receiving means for receiving pitted and unpitted fruit respectively.

5. In a machine for removing the pit from drupaceous fruit, apparatus for discriminating between pitted and unpitted fruit and segregating one from the other which comprises: a probe having a longitudinal axis mounted for reciprocal movement along said axis into engagement with said pit, a collar secured to said probe, resilient means acting upon said collar for moving said probe into engagement with said pit, and means for segregating said pitted fruit from said unpitted fruit depending upon the position of said probe during said engagement with said pit.

6. In a machine for removing the pit from drupaceous fruit wherein said machine has a frame, a pitting cycle, and means for moving said fruit along an arcuate path during said pitting cycle, apparatus for discriminating between pitted and unpitted fruit and segregating one from the other which comprises: a probe having a longitudinal axis mounted for reciprocal movement along said axis into gagement with said pit and further mounted for arcuate movement with said fruit, a collar secured to said probe, resilient spring means mounted to said frame in said arcuate path for engaging said collar and urging said probe into said engagement with said pit, and means for segregating said pitted fruit from said unpitted fruit depending upon the position of said collar during said engagement of said probe with said pit.

7. In a machine having a pitting cycle for removing the pit from drupaceous fruit, apparatus for segregating pitted from unpitted fruit which comprises:

(a) means for propelling said fruit along a path after said fruit has been subjected to said pitting cycle including:

(1) a shaft rotatable on its axis to thereby define a direction of rotation, (2) a plate mounted to said shaft and rotatable therewith to thereby define a plane of rotation, (3) a finger pivotally mounted to said plate for pivotal movement in said plane, (4) resilient means for constantly urging said finger to pivot in a direction opposite said direction of rotation, and (5) camming means including a fixed cam, a cam follower, and a cam follower arm fixed to said finger, said cam having a convex surface for pivoting said follower arm and finger against said resilient means and a concave surface for releasing said follower arm, finger, and resilient means;

(b) deflection means for obstructing said path including:

(1) a cam mounted to said shaft for rotation therewith, said cam having an outer cam surface and an inner cam surface, (2) a deflector plate mounted for movement into and out of said path, (3) a cam follower arm connected to said plate, (4) a cam follower pivotally mounted to said cam follower arm and means for maintaining said follower in contact with said cam, (5) a lockout lever mounted for reciprocal movement having a tripping face positioned for engagement with said collar, and an arm positioned for contact with said deflector plate during said engagement of said collar and tripping face, and resilient means for urging said lockout lever into engagement with said collar to thereby prevent movement of said deflector plate and operate against said means for maintaining said follower in contact with said cam; and (c) segregated receiving means for receiving said pitted and unpitted fruit respectively.

8. A method for discriminating between pitted and unpitted fruit and segregating one from the other which comprises:
  (a) pushing the pit from said fruit into pitting die,
  (b) holding said pit in said die,
  (c) directing a probe and index toward said pit in a direction opposing the direction of entry of said pit into said die to thereby engage said pit,
  (d) propelling said fruit along a path, and
  (e) obstructing said path of said fruit depending upon the position of said index during said engagement to thereby segregate pitted from unpitted fruit.

9. A method for discriminating between and segregating pitted from unpitted fruit wherein said fruit is subjected to a pitting cycle which comprises:
  (a) moving said fruit along an arcuate path during said pitting cycle,
  (b) discriminating between pitted and unpitted fruit after said fruit is subjected to said pitting cycle,
  (c) propelling said fruit along a path in a direction opposing the direction of said arcuate movement, and
  (d) directing said fruit to one of two segregated receiving mean.

References Cited by the Examiner

UNITED STATES PATENTS

| | | | |
|---|---|---|---|
| 2,232,207 | 2/1941 | Carroll | 146—19 |
| 2,418,949 | 4/1947 | McNally | 209—88 |
| 2,547,207 | 4/1951 | Harworth et al. | 146—19 |
| 2,611,403 | 9/1952 | Schafer | 146—17 |
| 2,612,197 | 9/1952 | Giordano | 146—17 |
| 2,635,662 | 4/1953 | Doering et al. | 146—18 |
| 2,981,410 | 4/1961 | Perrelli | 209—89 X |

FOREIGN PATENTS 827,301  2/1960  Great Britain.

ROBERT C. RIORDON, *Primary Examiner.*

WILLIE G. ABERCROMBIE, *Examiner.*